United States Patent [19]

Bondar et al.

[11] 4,234,462

[45] Nov. 18, 1980

[54] PROCESS FOR ACTIVATING A CATALYST

[76] Inventors: Petr G. Bondar, prospekt Kosmonavtov, 15, kv. 12; Anna S. Zavadskaya, ulitsa Lenina, 26, kv. 10, both of Severodonetsk Voroshilovgradskoi oblasti, U.S.S.R.

[21] Appl. No.: 1,371

[22] Filed: Jan. 5, 1979

[30] Foreign Application Priority Data

Jan. 5, 1978 [SU] U.S.S.R. .............................. 2558401

[51] Int. Cl.$^2$ .................. B01J 21/04; B01J 23/26; B01J 23/34; B01J 23/74; B01J 23/06; B01J 23/72

[52] U.S. Cl. .................. 252/463; 252/467; 252/468; 252/471; 252/472; 252/475; 252/476; 252/411 R; 252/414

[58] Field of Search ............... 252/463, 467, 471, 472, 252/475, 476, 411 R, 416, 468

[56] References Cited

U.S. PATENT DOCUMENTS

| | | | |
|---|---|---|---|
| 3,642,643 | 2/1972 | Habermann | 252/416 X |
| 3,790,505 | 2/1974 | Casey et al. | 252/475 X |
| 3,829,524 | 8/1974 | Senn et al. | 252/411 R |
| 3,952,070 | 4/1976 | Nowak et al. | 252/411 R |

*Primary Examiner*—W. J. Shine
*Attorney, Agent, or Firm*—Lackenbach, Lilling & Siegel

[57] ABSTRACT

A catalyst comprising, as an active ingredient, one of the following metals: copper, chromium, nickel, cobalt, manganese, zinc, and aluminum, is activated by the reduction of metals with an organic compound as a reducing agent. Such organic compounds as $C_8$–$C_{35}$ saturated hydrocarbons, $C_8$–$C_{19}$ unsaturated hydrocarbons, $C_8$–$C_{29}$ alicyclic hydrocarbons, $C_8$–$C_{10}$ aromatic hydrocarbons, $C_{11}$–$C_{13}$ aliphatic-aromatic hydrocarbons, $C_5$–$C_{30}$ monohydric alcohols, $C_2$–$C_6$ polyhydric alcohols, phenols, $C_7$–$C_{18}$ aliphatic aldehydes, $C_7$–$C_{18}$ aromatic aldehydes, $C_7$–$C_{35}$ aliphatic ketones, $C_6$–$C_{29}$ alicyclic ketones, $C_2$–$C_{31}$ aliphatic carboxylic acids, $C_2$–$C_{31}$ esters of aliphatic carboxylic acids, aromatic acids, carbohydrates, vegetable oils, animal fats, waxes, polyvinyl alcohols, polyvinyl acetate, polyethylene and polybutadiene, may be used as a reducing agent singly or mixed. The reducing agent is taken in an amount of 4 to 15 wt. %. per weight of the active ingredient of the catalyst. The process of reduction is carried out at a temperature ranging from 200° to 800° C.

22 Claims, No Drawings

PROCESS FOR ACTIVATING A CATALYST

BACKGROUND OF THE INVENTION

1. Field of the Invention

The invention relates to the production of catalysts, and specifically to a process for activating catalysts comprising as an active ingredient at least one of the following metals: copper, chromium, nickel, cobalt, manganese, zinc and aluminum.

Catalysts based on compounds such as oxides or salts of the above metals, in an active state are commonly used in methanol synthesis, conversion of carbon monoxide, hydrogenation of organic compounds and other catalytic processes of organic synthesis.

2. Description of the Prior Art

One widely used process for activating catalysts comprises reducing the metallic compounds contained therein to the metallic state or to compounds with a lower degree of oxidation, whereby the inactive form of a catalyst is rendered active.

The catalyst that is to be activated is usually in the form of pellets. The process of activation is generally carried out in container-type apparatus periodically charged with the catalyst mass in volumetric quantities, each equal to the volume capacity of the apparatus. In the process of activation, due to reduction of metals, the catalyst volume within the convertor becomes 10 to 20% less than the initial volume.

Known in the art is a process for obtaining a zinc-copper catalyst, which comprises reduction of the ZnO/CuO mass by passing therethrough a stream of gas consisting of hydrogen and a gas or gas mixture inert to the catalyst. The mixture of hydrogen reducing gas and an inert gas is passed through the catalyst until exit gases and inlet gases have approximately the same hydrogen content. The reduction temperature is maintained below 343° C. by varying hydrogen content in the stream of gas. The hydrogen content is maintained to be less than 5% by volume and in the course of treatment of the zinc-copper mass, this content is increased within the range of 0.3 to 5% by volume (British Patent No. 1,082,298).

There is also known a process for reducing a ZnO-CuO catalyst, comprising passing through the initial catalyst mass a gas mixture based on a gas inert to the catalyst with an admixture of hydrogen and carbon monoxide sufficient for an exothermic reaction to proceed.

The concentration of the reducing ingredients mentioned above in the gas mixture is therewith gradually increased from 0.5 to 5% by volume. The process is carried out at a temperature ranging from 149° to 288° C. (British Patent No. 1,137,357).

Also known in the art is a process for activating a catalyst useful in converting carbon monoxide and consisting of ZnO and CuO precursors, the process being carried out at a temperature below 371° C. In this process, the oxides forming part of the catalyst mass are acted upon by a gas stream comprising hydrogen as a reducing gas and a diluent gas selected from the group consisting of nitrogen, methane, ethane, propane or carbon dioxide. Reduction is effected with incremental increase in the reducing gas content in the gas stream. The temperature of the reduction zone is maintained in the range of 149° to 260° C. (British Patent No. 1,220,860).

Copper oxide-zinc oxide catalysts for use in low temperature carbon monoxide conversion processes are also activated by reducing the oxides in a gaseous medium comprising from 0.1 to 3% by volume of a reducing gas selected from the group consisting of hydrogen, carbon monoxide, and a diluent gas being the balance. The process is carried out at a temperature of 120° to 177° C. (U.S. Pat. No. 3,390,102).

There is known a process for reducing a Zn-Cu-Al catalyst useful in methanol synthesis by contacting the catalyst with a stream of a gas mixture constituted by hydrogen as a reducing gas and an inert diluent, such as natural gas or methane. The reduction process is carried out at standard or increased pressure and a temperature of from 120° to 180° C. (USSR Inventor's Certificate No. 403,427).

The reduction of copper catalysts used in methanol synthesis is taught in another prior art process as being carried out with a reducing mixture comprising a reducing gas, such as hydrogen or carbon monoxide in an amount of up to 10% by volume, carbon dioxide up to 15 vol % per volume of the reducing as, the balance being an inert diluent, such as methane, nitrogen. The reduction is effected at a temperature of 90° to 130° C. (USSR Inventor's Certificate No. 429,837).

As can be seen from the above analysis of the prior art, the activation of catalysts by reducing metal oxides constituting the catalyst mass is effected at a low concentration of a reducing gas in a gaseous mixture fed to the reaction zone, said concentration not exceeding the total volume of the gas being recycled. Such limitation is dictated by the hazard of catalyst particles sintering into a dense mass under the influence of heat from exothermic reduction reactions, and precludes the possibility of the activation process being thermally intensified and necessitates the temperature be confined to at most 280° C.

In addition, the prior art processes for activating catalysts require considerable power inputs for heating and circulating the mixture of the reducing gas and the diluent gas. Thus, in the process disclosed in USSR Inventor's Certificate No. 403,427 the power inputs are 10,000 to 15,000 kW/h per ton of the catalyst mass.

It should also be noted that complicated equipment is required for the process for reducing catalysts with a mixture of reducing and inert gases, the volumetric ratio of which is to vary as the process cycle proceeds. Thus, for compressing a mixture of reducing and inert gases and for feeding it to a recycle system, a compressor must operate in combination with a ratio controller for said gases and be provided with a control circuit for taking account of variations in the physical and mechanical properties of mixtures of said gases in the case of different volumetric ratios thereof. A cumbersome drying system for drying large volumes of the circulating gas, also adds to the complexity of the equipment used to carry out the prior art processes. This drying system is a prerequisite for practicing the prior art processes, since feeding of an insufficiently dried circulating gas to the inlet of the activation apparatus lowers the rate of the process of reducing metal oxides and affects to a certain extent the quality of the catalyst thus activated.

SUMMARY OF THE INVENTION

An object of the present invention is to provide a process ensuring an increase in the intensity of the catalyst activation.

A further object of the present invention is to provide a process enabling the degree of charging of the activation apparatus to be increased.

Yet another object of the present invention is to provide a process improving the quality of the product.

A further object of the present invention is to simplify the process for activating a catalyst.

These and other objects which will be readily apparent from consideration of the specification are attained in a process for activating a catalyst including, as an active ingredient, at least of the following metals: copper, chromium, nickel, cobalt, manganese, zinc, and aluminum, by treating it with a reducing agent, wherein, according to the invention, as the reducing agent use is made of compounds selected from the group consisting of $C_8$–$C_{35}$ saturated hydrocarbons, $C_8$–$C_{19}$ unsaturated hydrocarbons, $C_8$–$C_{29}$ alicyclic hydrocarbons, $C_8$–$C_{10}$ aromatic hydrocarbons, $C_{11}$–$C_{13}$ aliphatic-aromatic hydrocarbons, $C_5$–$C_{30}$ monohydric alcohols, $C_2$–$C_6$ polyhydric alcohols, phenols, $C_7$–$C_{18}$ aliphatic aldehydes, $C_7$–$C_{18}$ aromatic aldehydes, $C_7$–$C_{35}$ aliphatic ketones, $C_6$–$C_{29}$ alicyclic ketones, $C_2$–$C_{31}$ aliphatic carboxylic acids, $C_2$–$C_{31}$ esters of aliphatic carboxylic acids, aromatic acids, carbohydrates, vegetable oils, animal fats, waxes, polyvinyl alcohol, polyvinyl acetate, polyethylene and polybutadiene, said reducing agent being mixed with the catalyst in an amount of 4 to 15 wt.% per weight of the active ingredient of the catalyst, and the resulting mixture is subjected to treatment at a temperature ranging from 200° to 800° C. in an atmosphere inert to the catalyst.

The reducing agent is used in an amount of 4 to 15 wt.% per weight of the active ingredient of the catalyst, depending on the kind of the catalyst and the required degree of reduction thereof (60 to 100%).

The use of less than 4 wt. % of the reducing agent is rather inefficient, since the catalyst reduction will be only 30 to 40%, while treatment with more than 15 wt.% of the reducing agent is unreasonable, since the amount of 15 wt.% is sufficient for practically complete reduction of the oxides.

A wide range of organic compounds with a boiling point above 120° C. is useful in the process of the invention as the reducing agent.

According to the invention, particular reducing agents may be glycerin and pentaerythritol as polyhydric alcohols: mono-, di-, and polysaccharides as carbohydrates; cyclohexanol as a monohydric alcohol; and cyclohexanone, cyclononacosanone and dipropyl ketone as ketones of the alicyclic and aliphatic series respectively.

Moreover, benzoic acid may be used as a carboxylic acid, benzaldehyde as an aldehyde, diphenyl and naphthalene as aromatic hydrocarbons, diphenylmethane and methylnaphthalene as aliphatic-aromatic hydrocarbons.

Paraffin and octene may constitute saturated and unsaturated hydrocarbons respectively $C_{16}$–$C_{35}$ paraffinic hydrocarbons can be used to advantage.

The present invention, by virtue of such reducing agents, enables the activation process to be intensified and, hence, the catalyst residence time in the activation zone under high-temperature conditions to be cut down. At a fairly rapid rate of the process, phase transformations occur under conditions which are far from equilibrium ones, thus making for higher concentration of active centers on the surface of the catalyst and, hence, for an enhancement of its activity.

According to the invention, for reducing a catalyst use may be made either of one of the above-cited organic reducing agents taken singly, or of a mixture thereof.

The catalyst is treated with a reducing agent at a temperature ranging from 200° to 800° C. The lower temperature limit is determined by the possibility of initiation, the latter depending on the kind of the organic substance used as the reducing agent, while a reduction temperature higher than the upper limit is not advisable in view of catalyst sintering.

The present process provides for the reduction to be carried out through the reaction between oxygen contained in the crystal lattice of the catalyst and the organic substance. As a result of the reaction the organic substance becomes oxidized predominantly to $CO_2$ and water, while the catalyst oxides, losing oxygen, become reduced to metals.

The process for activating a catalyst is performed as follows.

A powdery or pasty catalyst mass wherein the active ingredient is in the oxidized state in the form of oxides or salts, is thoroughly mixed at least with one of the above-specified organic compounds which may be in a liquid or solid state, or in the form of solution.

Compounds having a relatively low boiling point and high vapor pressure, such as water, acetone, lower monohydric alcohols, ethers, may be used as solvents.

The mixture of the catalyst mass with a selected reducing agent, if necessary, is dried at room or elevated temperature sufficient for an intensive removal of the solvent, and then the mixture is subjected to heat treatment in an inert gas or in air at a temperature ranging from 200° to 800° C., depending on the catalyst composition.

For zinc-chromium catalysts usable in methanol synthesis the temperature of heat treatment lies within the range of 200° to 350° C.; for copper catalysts usable in methanol synthesis said temperature is in the range of 400° to 650° C.; for nickel catalysts usable in hydrogenation of unsaturated compounds and for cobalt-manganese catalysts employed for oxidation of hydrocarbons it is within the range of 200° to 800° C.

The process of the invention offers the following advantages over the prior-art processes for activating catalysts. First, the present activation process is more efficient. Second, the circulation of large amounts of gas and heating thereof, being obviated, the power input for effecting the process is reduced by a factor of 20 to 30. Third, the use of complicated compressor and drying equipment is eliminated.

The examples given as below illustrate the way to practicing the process of the invention.

EXAMPLE 1

Octane, as a reducing agent, having the boiling point equal to 125.7° C., in an amount of 0.8 kg (8 wt.%) was added to 10 kg of calcined powdery catalyst mass comprising 61.5 wt.% of copper oxide, 32.0 wt.% of zinc oxide, and 6.5 wt.% of alumina and then mixed in a mixer apparatus. The resulting mixture was charged into a reducing furnace and was subjected to heat treatment in a nitrogen atmosphere at 500° C. The heat treatment was carried out till reaction gases, i.e. carbon dioxide and water vapor, forming in the reduction of oxides, ceased to evolve. The effluent gas composition was checked by means of a gas chromatograph apparatus.

The reduced and cooled catalyst was mixed with 2 wt.% of graphite and shaped into cylindrical pellets of 5×5 mm.

The activated catalyst was subjected to testing for determining the following characteristics thereof:
degree of reduction,
crushing strength (of pellets),
activity, The degree of reduction was determined as the ratio of an elemental metal concentration in the activated catalyst to the total concentration of the same metal in the catalyst mass. The respective concentrations, namely those of copper, were determined by conventional methods of chemical analysis.

The crushing strength was determined by loading, in a diametrical plane, catalyst samples shaped as cylindrical pellets of the above dimensions.

Catalyst activity was determined in the process of methanol synthesis by the end product output per unit mass or unit volume of the activated catalyst per unit of time. The process was carried out under the following conditions:

| | |
|---|---|
| pressure | 50 atm; |
| temperature | 220° C.; |
| gas space velocity at $H_2:CO = 2:1$ | 10,000 $h^{-1}$; |
| $CO_2$ content | 8 vol. % |

The tests and analysis have shown the following results:

| | |
|---|---|
| degree of reduction | 60%; |
| crushing strength | 80 kgf/cm$^2$; |
| activity | 1.1 ml methanol per ml catalyst per hour. |

EXAMPLE 2

Finely crushed $C_{35}$ pentatriacontane (b.p. 486° C.) in an amount of 9 grams (9 wt. %) was added to 100 grams of the catalyst mass as specified in Example 1 and mixed. The mass was reduced at 550° C. by following the same procedure as in Example 1. The degree of reduction was 75%. Properties of the reduced catalyst and storage conditions thereof were similar to those set forth in Example 1.

EXAMPLE 3

A mixture of $C_8$–$C_{15}$ liquid paraffins (b.p. of components 125.7°–270.6° C.) in an amount of 1.0 kg (10 wt.%) was poured into 10 kg of the calcined mass of Example 1. The mass was mixed and reduced at 500° C. by following the procedure specified in Example 1. The degree of reduction was 65%.

EXAMPLE 4

Finely crushed commercial-grade $C_{16}$–$C_{35}$ paraffin (b.p. 280.8°–486° C.) in an amount of 0.8 kg (8 wt.%) was added to 10 kg of the mass of Example 1, mixed, and reduced at 550° C. by following the same procedure as in Example 1. The degree of reduction was 87%.

EXAMPLE 5

$C_8$ octene (b.p. 121.3° C.) in an amount of 80 grams (8 wt.%) was added to 1 kg of the catalyst mass in the form of a paste obtained by precipitation and containing carbonates of copper, zinc and alumina hydrate calculated as metal oxides in the following quantities: 61% copper oxide; 32.5% zinc oxide; 6.5% alumina. The mass was mixed, dried at 100° C., finely divided, and reduced by following the same procedure as in Example 1. The degree of reduction of the catalyst was 60%.

EXAMPLE 6

$C_{18}$ octadecene (b.p. 314.8° C.) in an amount of 90 grams (9 wt.%) was added to 1. kg of the catalyst mass of Example 5, mixed, dried following the procedure specified in Example 5, finely divided and reduced at 600° C. as in Example 1. The degree of reduction was 85%.

EXAMPLE 7

$C_8$ octene (b.p. 126.2° C.) in an amount of 100 grams (10 wt.%) was added to 1 kg of the mass of Example 1, mixed and was reduced at 450° C. following the procedure specified in Example 1. The degree of reduction was 75%.

EXAMPLE 8

Finely crushed $C_{18}$ octadecene (b.p. 313° C.) in an amount of 100 grams (10 wt.%) was added to 1 kg of the mass of Example 1. The mass was mixed and was reduced at 450° C. following the procedure specified in Example 1. The degree of reduction was 86%.

EXAMPLE 9

Chromium anhydride in an amount of 60 grams was ground in a porcelain jar, 100 grams zinc oxide was added, and the mixture was thoroughly mixed. When mixing the ingredients, 30 ml of distilled water was added. A solution of 11 grams of pentaerythritol in 30 ml of water was then added to the mixture obtained, and was thoroughly mixed. The resulting mixture was dried and subjected to a heat treatment in a furnace atmosphere of nitrogen at 250° C. The degree of reduction, defined as the ratio between the reduced chromium and the total content of chromium in the catalyst mass, was 90%.

The reduced catalyst was tested in the course of methanol synthesis under the following conditions:

| | |
|---|---|
| pressure | 250 atm. |
| temperature | 360° C. |
| gas space velocity at $H_2:CO = 2:1$ | 40,000 $h^{-1}$. |

The tests showed that the catalyst activity was 7.2 ml of methanol per 1 mol of the catalyst per hour.

EXAMPLE 10

Amyl alcohol (b.p. 137.8° C.) in an amount of 10 grams (10 wt.%) was added to 100 grams of powdery mass of a zinc-chromium catalyst, obtained by means of mixing zinc oxide with chromium anhydride. The catalyst mass with amyl alcohol was thoroughly mixed and subjected to heat treatment in air at 200° C. The degree of reduction of the catalyst, defining following the same procedure as in Example 9, was 60%.

EXAMPLE 11

$C_7$ heptyl alcohol (b.p. 176.3° C.) in an amount of 10 grams (10 wt.%) was added to 100 grams of the mass of Example 10, mixed and was reduced in an atmosphere of nitrogen at 250° C. The degree of reduction was 80%.

EXAMPLE 12

$C_{30}$ myricyl alcohol in an amount of 6 grams (6 wt.%) was added to 100 grams of the mass of Example 1, was mixed and reduced in an atmosphere of nitrogen following the procedure as in Example 1. The degree of reduction was 75%.

EXAMPLE 13

Ethylene glycol (b.p. 197° C.) in an amount of 120 grams (12 wt.%) was added to 1 kg of the catalyst mass of Example 10, was mixed and reduced at 250° C. following the same procedure as in Example 9. The degree of reduction was 100%.

EXAMPLE 14

Crushed 2,3-dimethyl-2,3-butanediol (b.p. 172° C.) in an amount of 120 grams (12 wt.%) was added to 1 kg of the catalyst mass of Example 10, and the mass was subjected to a heat treatment at 300° C. The degree of reduction defined following the same procedure as in Example 9 was 95%.

EXAMPLE 15

Glycerin (b.p. 290° C.) in an amount of 300 grams (3 wt.%) was added under mixing to 10 kg of the calcined powdery catalyst mass containing oxides of copper, zinc, aluminum and chromium in the following ratio: 52% CuO; 27% ZnO; 5% $Al_2O_3$; 10% $Cr_2O_3$. The mass was subjected to a heat treatment at 500° C. following the same procedure as in Example 1. The degree of reduction, defined as the ratio between copper in reduced state and a total content of copper in the catalyst was 35%.

This example illustrates insufficiency of the reducing agent (glycerin) percentage, which is less than 5 wt. %, to bring the catalyst to the required degree of reduction.

EXAMPLE 16

Glycerin in an amount of 500 grams (5 wt.%) was added to 10 kg of the catalyst mass of Example 15, and the mass was subjected to a heat treatment at 500° C. following the procedure specified in Example 1. The degree of reduction was 45%.

EXAMPLE 17

Glycerin in an amount of 800 grams (8 wt.%) was added to 10 kg of the catalyst mass of Example 15. The mass was subjected to a heat treatment at 500° C. following the same procedure as in Example 1. The degree of reduction was 70%.

EXAMPLE 18

Glycerin in an amount of 1.3 kg (13 wt.%) was added to 10 kg of the catalyst mass of Example 15. The mass was subjected to a heat treatment at 500° C. following the same procedure as in Example 1. The degree of reduction was 97%.

EXAMPLE 19

Glycerin in an amount of 1.5 kg (15 wt.%) was added to 10 kg of the catalyst mass of Example 15. The mass was subjected to a heat treatment at 500° C. following the same procedure as in Example 1. The degree of reduction was 100%.

EXAMPLE 20

Glycerin in an amount of 1.7 kg (17 wt.%) was added to 10 kg of the catalyst mass of Example 15. The mass was subjected to a heat treatment at 500° C. following the same procedure as in Example 1. The degree of reduction was 100%.

This example illustrates that the reducing agent (glicerin) in an amount of more than 15 wt.% is not practicable since 15 wt.% of the same is sufficient to completely reduce the catalyst as has been shown in Example 19.

EXAMPLE 21

A solution of pentaerythritol (b.p. 253° C.) in an amount of 80 grams (8 wt.%) in 300 ml of water was added to 1 kg of the catalyst mass of Example 1. The mass was mixed, dried and subjected to a heat treatment at 600° C. following the procedure specified in Example 1. The degree of reduction was 80%.

EXAMPLE 22

Polyvinyl alcohol in an amount of 6 grams (6 wt.%) was added to 100 grams of the mass of Example 10. The mass was mixed and subjected to a heat treatment at 350° C. following the same procedure as in Example 10. The degree of reduction was 73%.

EXAMPLE 23

Heptaldehyde (b.p. 185° C.) in an amount of 10 grams (10 wt.%) was added to 100 grams of the catalyst mass of Example 15. The mass was mixed and subjected to a heat treatment at 500° C. following the same procedure as in Example 1. The degree of reduction was 80%.

EXAMPLE 24

Stearaldehyde (b.p. 212° C.) in an amount of 10 grams (10 wt.%) was added to 100 grams of the catalyst mass of Example 15. The mass was mixed and subjected to a heat treatment at 550° C. following the same procedure as in Example 1. The degree of reduction was 80%.

EXAMPLE 25

Dipropyl ketone (b.p. 144° C.) in an amount of 90 grams (9 wt.%) was added to 1 kg of the catalyst mass of Example 1. The mass was thoroughly mixed and subjected to a heat treatment at 550° C. following the same procedure as in Example 1. The degree of reduction was 90%.

EXAMPLE 26

Finely crushed stearin in an amount of 8 grams (8 wt.%) was added to 100 grams of the catalyst mass of Example 1. The mass was mixed and subjected to a heat treatment at 550° C. following the same procedure as in Example 1. The degree of reduction was 85%.

EXAMPLE 27

Acetic acid in an amount of 100 grams (10 wt.%) was added to 1 kg of the catalyst mass of Example 1. The mass was mixed and subjected to a heat treatment at 550° C. following the same procedure as in Example 1. The degree of reduction was 75%.

EXAMPLE 28

Butyric acid in an amount of 5 grams was added, under continuous mixing, to 100 grams of the powdery catalyst mass containing 50% NiO per 50 wt. % of kieselguhr. The mass was subjected to a heat treatment at 700° C. following the same procedure as in Example 1. The degree of reduction defined as the ratio between nickel in reduced state and total content of nickel in the catalyst was 80%.

EXAMPLE 29

Melissic acid in an amount of 8 grams (8 wt.%) was added to 100 grams of the catalyst mass of Example 15. The mass was thoroughly mixed and subjected to a heat treatment at 550° C. following the same procedure as in Example 1. The degree of reduction was 70%.

EXAMPLE 30

Oxalic acid (b.p. 189.5° C.) in an amount of 8 grams (8 wt.%) was added to 100 grams of the catalyst mass of Example 1. The mass was mixed and subjected to a heat treatment at 500° C. following the same procedure as in Example 1. The degree of reduction was 65%.

EXAMPLE 31

Adipic acid (b.p. 153° C.) in an amount of 10 grams (10 wt.%) was added to 100 grams of the catalyst mass of Example 1. The mass was mixed and subjected to a heat treatment at 500° C. following the same procedure as in Example 1. The degree of reduction was 75%.

EXAMPLE 32

$\delta,\omega$-octacosane dicarboxylic acid (b.p. 123° C.) in an amount of 5 grams (5 wt.%) was added to 100 grams of the catalyst mass of Example 1. The mass was subjected to a heat treatment at 500° C. following the same procedure as in Example 1. The degree of reduction was 60%.

EXAMPLE 33

Butyl propionate (b.p. 127.7° C.) in an amount of 8 grams (8 wt. %) was added to 100 grams of the catalyst mass of Example 15. The mass was mixed and subjected to a heat treatment at 450° C. following the same procedure as in Example 1. The degree of reduction was 70%.

EXAMPLE 34

Ethyl triacontanate (b.p. 199° C.) in an amount of 8 grams (8 wt.%) was added to 100 grams of the catalyst mass of Example 15. The mass was mixed and subjected to a heat treatment at 450° C. following the same procedure as in Example 1. The degree of reduction was 75%.

EXAMPLE 35

Finely crushed wax in an amount of 100 grams (10 wt%) was added to 1 kg of the nickel-copper catalyst containing 70% NiO; 30% CuO. The mass was mixed and subjected to a heat treatment at 800° C. following the same procedure as in Example 1. The degree of reduction defined as the ratio between reduction of nickel and copper and total content of nickel and copper in the catalyst was 85%.

EXAMPLE 36

Sunflower seed oil in an amount of 8 grams (8 wt.%) was added to 100 grams of the catalyst mass of Example 15. The mass was mixed and subjected to a heat treatment at 500° C. following the same procedure as in Example 1. The degree of reduction was 85%.

EXAMPLE 37

Beef tallow in an amount of 10 grams (10 wt.%) was added to 100 grams of the catalyst mass of Example 28. The mass was mixed and subjected to a heat treatment at 700° C. following the same procedure as in Example 1. The degree of reduction was 85%.

EXAMPLE 38

Saccharose in an amount of 10 grams (10 wt.%) and 30 ml of distilled water were added to 100 grams of the catalyst mass of Example 15. The mass was mixed, dried, finely crushed and was subjected to a heat treatment at 550° C. following the same procedure as in Example 1. The degree of reduction was 80%.

EXAMPLE 39

Glucose in an amount of 4 grams (8 wt.%) and 15 ml of distilled water were added to 50 grams of the catalyst mass of Example 15. The mass was mixed, dried and was subjected to a heat treatment at 550° C. following the procedure specified in Example 1. The degree of reduction was 80%.

EXAMPLE 40

Starch in an amount of 10 grams (10 wt.%) was added to 100 grams of the catalyst mass of Example 28. The mass was mixed and subjected to a heat treatment at 700° C. following the same procedure as in Example 1. The degree of reduction was 90%.

EXAMPLE 41

Cellulose in an amount of 7 grams (7 wt.%) was added to 100 grams of the catalyst mass of Example 10. The mass was mixed and subjected to a heat treatment at 300° C. following the same procedure as in Example 10. The degree of reduction was 75%.

EXAMPLE 42

Polyvinylacetate in an amount of 100 grams (10 wt.%) was added to 1 kg of the catalyst mass of Example 1. The mass was mixed and subjected to a heat treatment at 500° C. following the same procedure as in Example 1. The degree of reduction was 80%.

EXAMPLE 43

Polybutadiene in an amount of 8 grams (8 wt.%) was added to 100 grams of the catalyst mass of Example 1. The mass was mixed and subjected to a heat treatment at 550° C. following the same procedure as in Example 1. The degree of reduction was 75%.

EXAMPLE 44

Powdered polyethylene in an amount of 7 grams (7 wt.%) was added to 100 grams of the catalyst mass of Example 1. The mass was mixed and subjected to a heat treatment at 400° C. following the same procedure as in Example 1. The degree of reduction was 70%.

EXAMPLE 45

Cyclo-octane in an amount of 10 grams (10 wt.%) was added to 100 grams of the catalyst mass of Example 15. The mass was mixed and subjected to a heat treatment at 600° C. following the same procedure as in Example 1. The degree of reduction was 75%.

EXAMPLE 46

Cyclononacosane (b.p. 215° C.) in an amount of 6 grams (6 wt.%) was added to 100 grams of the catalyst mass of Example 1. The mass was mixed and subjected to a heat treatment at 650° C. following the same procedure as in Example 1. The degree of reduction was 70%.

EXAMPLE 47

Cyclohexanol (b.p. 161.1° C.) in an amount of 10 grams (10 wt.%) was added to 100 grams of the catalyst mass of Example 15. The mass was mixed and subjected to a heat treatment at 550° C. following the same procedure as in Example 1. The degree of reduction was 80%.

EXAMPLE 48

Cyclohexanone (b.p. 202° C.) in an amount of 10 grams (10 wt.%) was added to 100 grams of the catalyst mass of Example 15. The mass was mixed and subjected to a heat treatment at 550° C. following the same procedure as in Example 1. The degree of reduction was 80%.

EXAMPLE 49

Cyclononacosanone (b.p. 220° C.) in an amount of 6 grams (6 wt.%) was added to 100 grams of the catalyst mass of Example 15. The mass was mixed and subjected to a heat treatment at 550° C. following the same procedure as in Example 1. The degree of reduction was 70%.

EXAMPLE 50

Xylene (b.p. 144° C.) in an amount of 8 grams (8 wt.%) was added to 100 grams of the catalyst mass of Example 10. The mass was thoroughly mixed and subjected to a heat treatment at 300° C. following the same procedure as in Example 9. The degree of reduction was 90%.

EXAMPLE 51

Ethylbenzene (b.p. 136.2° C.) in an amount of 100 grams (10 wt.%) was added to 1 kg of the catalyst mass of Example 1. The mass was mixed and subjected to a heat treatment at 550° C. following the same procedure as in Example 1. The degree of reduction was 90%.

EXAMPLE 52

Phenylic acid in an amount of 100 grams (10 wt.%) was added to 1 kg of the catalyst mass of Example 1. The mass was mixed and subjected to a heat treatment at 550° C. following the same procedure as in Example 1. The degree of reduction was 85%.

EXAMPLE 53

Tert-butylbenzene (b.p. 169.1° C.) in an amount of 8 grams (8 wt.%) was added to 100 grams of the catalyst mass of Example 15. The mass was mixed and subjected to a heat treatment at 550° C. following the same procedure as in Example 1. The degree of reduction was 75%.

EXAMPLE 54

Cumene in an amount of 8 grams (8 wt.%) was added to 100 grams of the catalyst mass of Example 1. The mass was mixed and subjected to a heat treatment at 550° C. following the same procedure as in Example 1. The degree of reduction was 85%.

EXAMPLE 55

O-cresol (b.p. 190.9° C.) in an amount of 10 grams (10 wt.%) was added to 100 grams of the catalyst mass of Example 1. The mass was mixed and subjected to a heat treatment at 500° C. following the same procedure as in Example 1. The degree of reduction was 95%.

EXAMPLE 56

Diphenyl ether in an amount of 10 grams (10 wt.%) was added to 100 grams of the catalyst mass of Example 1. The mass was mixed and subjected to a heat treatment at 500° C. following the same procedure as in Example 1. The degree of reduction was 80%.

EXAMPLE 57

5-methyl-2-isopropyl-1-oxybenzene (b.p. 232.9° C.) in an amount of 8 grams (8 wt.%) was added to 100 grams of the catalyst mass of Example 15. The mass was mixed and subjected to a heat treatment at 550° C. following the same procedure as in Example 1. The degree of reduction was 80%.

EXAMPLE 58

Benzyl alcohol in an amount of 10 grams (10 wt.%) was added to 100 grams of the catalyst mass of Example 1. The mass was mixed and subjected to a heat treatment at 550° C. following the same procedure as in Example 1. The degree of reduction was 85%.

EXAMPLE 59

Benzaldehyde in an amount of 10 grams (10 wt.%) was added to 100 grams of the catalyst mass of Example 10. The mass was mixed and subjected to a heat treatment at 350° C. following the same procedure as in Example 10. The degree of reduction was 90%.

EXAMPLE 60

Acetophenone in an amount of 10 grams (10 wt.%) was added to 100 grams of the catalyst mass of Example 1. The mass was mixed and subjected to a heat treatment at 500° C. following the same procedure as in Example 1. The degree of reduction was 85%.

EXAMPLE 61

Benzoic acid in an amount of 8 grams (8 wt.%) was added to 100 grams of the catalyst mass of Example 15. The mass was mixed and reduced at 500° C. The degree of reduction was 80%.

EXAMPLE 62

Pyrocatechol (b.p. 245° C.) in an amount of 8 grams (8 wt.%) was added to 100 grams of the catalyst mass of Example 15. The mass was mixed and subjected to a heat treatment at 550° C. following the same procedure as in Example 1. The degree of reduction was 80%.

EXAMPLE 63

Resorcinol (b.p. 5° C.) in an amount of 8 grams (8 wt.%) was added to 100 grams of the catalyst mass of Example 15. The mass was mixed and subjected to a heat treatment at 550° C. following the same procedure as in Example 1. The degree of reduction was 80%.

EXAMPLE 64

Hydroquinone (b.p. 286.2° C.) in an amount of 8 grams (8 wt.%) was added to 100 grams of the catalyst mass of Example 15. The mass was mixed and subjected to a heat treatment at 550° C. following the same procedure as in Example 1. The degree of reduction was 80%.

EXAMPLE 65

Pyrogallol (b.p. 309° C.) in an amount of 8 grams (8 wt.%) was added to 100 grams of the catalyst mass of Example 15. The mass was mixed and subjected to a heat treatment at 550° C. following the same procedure as in Example 1. The degree of reduction was 80%.

EXAMPLE 66

Naphthalene in an amount of 8 grams (8 wt.%) was added to 100 grams of the catalyst mass of Example 15. The mass was mixed and subjected to a heat treatment at 550° C. following the same procedure as in Example 1. The degree of reduction was 85%.

EXAMPLE 67

Diphenyl in an amount of 8 grams (8 wt.%) was added to 100 grams of the catalyst mass of Example 1. The mass was mixed and subjected to a heat treatment at 450° C. following the same procedure as in Example 1. The degree of reduction was 80%.

EXAMPLE 68

Diphenylmethane in an amount of 8 grams (8 wt.%) was added to 100 grams of the catalyst mass of Example 15. The mass was mixed and subjected to a heat treatment at 550° C. following the same procedure as in Example 1. The degree of reduction was 80%.

EXAMPLE 69

Methylnaphthalene in an amount of 7 grams (7 wt.%) was added to 100 grams of the catalyst mass of Example 15. The mass was mixed and subjected to a heat treatment at 500° C. The degree of reduction was 80%.

EXAMPLE 70

Finely crushed stearin in an amount of 6 grams (12 wt.%) was added to 50 grams of the catalyst mass having the following composition: 66% Co; 3.6% Mn; 30% $H_3PO_4$; 0.4% $Na_2O_3$. The mass was mixed and subjected to a heat treatment at 800° C. following the same procedure as in Example 1. The degree of reduction was 95%.

EXAMPLE 71

A mixture consisting of 5 grams of glycerin and 5 grams (10 wt.%) of ethylene glycol was added to 100 grams of the catalyst of Example 70, thoroughly mixed and the resulting mixture was subjected to a heat treatment at 700° C. following the same procedure as in Example 1. The degree of reduction was 90%.

While the invention has been described herein in terms of the specific Examples, which are to be taken as preferred, numerous variations may be made in the invention without departing from the spirit and scope thereof as set forth in the appended claims.

What is claimed is:

1. A process for activating a catalyst including, as an active ingredient, at least one of the following metals: copper, chromium, nickel, cobalt, manganese, zinc, and aluminum, which process consists essentially of the steps of:

mixing the catalyst with a reducing agent selected from the group consisting of $C_8$–$C_{35}$ saturated hydrocarbons, $C_8$–$C_{19}$ unsaturated hydrocarbons, $C_8$–$C_{29}$ alicyclic hydrocarbons, $C_8$–$C_{10}$ aromatic hydrocarbons, $C_{11}$–$C_{13}$ aliphatic-aromatic hydrocarbons, $C_5$–$C_{30}$ monohydric alcohols, $C_2$–$C_6$ polyhydric alcohols, phenols, $C_7$–$C_{18}$ aliphatic aldehydes, $C_7$–$C_{18}$ aromatic aldehydes, $C_7$–$C_{35}$ aliphatic ketones, $C_6$–$C_{29}$ alicyclic ketones, $C_2$–$C_{31}$ aliphatic carboxylic acids, $C_2$–$C_{31}$ esters of aliphatic carboxylic acids, aromatic acids, carbohydrates, vegetable oils, animal fats, waxes, polyvinyl alcohol, polyvinyl acetate, polyethylene and polybutadiene, in an amount of 4 to 15 wt.% per weight of the active ingredient of the catalyst;

and subsequently heating the resulting mixture to a temperature ranging from 200° to 800° C. in an atmosphere inert to the catalyst.

2. A process of claim 1, wherein the $C_8$–$C_{10}$ aromatic hydrocarbon is diphenyl.

3. A process of claim 1, wherein the $C_8$–$C_{10}$ aromatic hydrocarbon is naphthalene.

4. A process of claim 1, wherein the $C_{11}$–$C_{13}$ aliphatic-aromatic hydrocarbon is diphenylmethane.

5. A process of claim 1, wherein the $C_{11}$–$C_{13}$ aliphatic-aromatic hydrocarbon is methylnaphthalene.

6. A process of claim 1, wherein the $C_5$–$C_{30}$ monohydric alcohol is cyclohexanol.

7. A process of claim 1, wherein the $C_2$–$C_6$ polyhydric alcohol is pentaerythritol.

8. A process of claim 1, wherein the $C_2$–$C_6$ polyhydric alcohol is glycerin.

9. A process of claim 1, wherein the $C_7$–$C_{18}$ aldehyde is benzaldehyde.

10. A process of claim 1, wherein the $C_6$–$C_{29}$ alicyclic ketone is cyclohexanone.

11. A process of claim 1, wherein the $C_8$–$C_{29}$ alicyclic ketone is cyclononacosanone.

12. A process of claim 1, wherein the $C_7$–$C_{35}$ aliphatic ketone is dipropyl ketone.

13. A process of claim 1, wherein the $C_2$–$C_{31}$ aliphatic carboxylic acid is benzoic acid.

14. A process of claim 1, wherein the carbohydrates are monosaccharides.

15. A process of claim 1, wherein the carbohydrates are disaccharides.

16. A process of claim 1, wherein the carbohydrates are polysaccharides.

17. A process of claim 1, wherein the $C_8$–$C_{35}$ saturated hydrocarbon is $C_{16}$–$C_{35}$ paraffin.

18. A process of claim 1, wherein the $C_8$–$C_{19}$ unsaturated hydrocarbon is octene.

19. The process of claim 1, wherein said metals are in the form of oxides or salts.

20. The process of claim 1, wherein the catalyst is zinc-chromium, and the temperature varies from 200°–350° C.

21. The process of claim 1, wherein the catalyst is copper, and the temperature varies from 400°–650° C.

22. The process of claim 1, wherein the inert atmosphere is nitrogen.

* * * * *